US012506176B2

United States Patent
Reiter et al.

(10) Patent No.: US 12,506,176 B2
(45) Date of Patent: Dec. 23, 2025

(54) ELECTROCHEMICAL CELL, ELECTROLYTE SUITABLE FOR THE FILLING THEREOF, PRODUCTION METHOD THEREOF, AND METHOD FOR THE OPERATION THEREOF

(71) Applicant: Bayerische Motoren Werke Aktiengesellschaft, Munich (DE)

(72) Inventors: Jakub Reiter, Munich (DE); Philipp Oberhumer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 768 days.

(21) Appl. No.: 15/468,299

(22) Filed: Mar. 24, 2017

(65) Prior Publication Data
US 2017/0200978 A1    Jul. 13, 2017

Related U.S. Application Data

(63) Continuation of application No. PCT/EP2015/069107, filed on Aug. 20, 2015.

(30) Foreign Application Priority Data

Sep. 25, 2014   (DE) ..................... 10 2014 219 414.8

(51) Int. Cl.
*H01M 10/0567*   (2010.01)
*H01M 4/66*   (2006.01)
(Continued)

(52) U.S. Cl.
CPC ....... *H01M 10/0569* (2013.01); *H01M 4/661* (2013.01); *H01M 10/052* (2013.01);
(Continued)

(58) Field of Classification Search
CPC ............ H01M 10/0569; H01M 4/661; H01M 10/0567
See application file for complete search history.

(56) References Cited

U.S. PATENT DOCUMENTS

| 7,247,404 B2 | 7/2007 | Jung et al. |
| 2004/0053129 A1* | 3/2004 | Jung ................... H01M 2/0212 |
| | | 429/188 |

(Continued)

FOREIGN PATENT DOCUMENTS

| CN | 103531839 A | 1/2014 |
| DE | 10 2011 054 119 A1 | 4/2013 |

(Continued)

OTHER PUBLICATIONS

English Translation of WO 2011/077939 (Year: 2011).*

(Continued)

*Primary Examiner* — Osei K Amponsah
(74) *Attorney, Agent, or Firm* — Crowell & Moring LLP

(57) ABSTRACT

An electrochemical cell includes a negative electrode, a positive electrode, an aluminum current collector that is connected to the positive electrode in an electrically conductive manner, and an electrolyte. The electrolyte includes non-ionic organic compounds present in an amount of less than 1.0 wt % of the total electrolyte, and an ionic liquid as a solvent. The ionic liquid is present in the electrolyte in an amount of at least 80 wt % of all electrolytes. In addition, the ionic liquid includes a cation of the formula:

$$\begin{array}{c} R^4 \quad \oplus \quad R^3 \\ \diagdown N \diagup \\ \diagup \quad \diagdown \\ R^1 \quad R^2 \end{array}$$

(Continued)

and an anion of the formula:

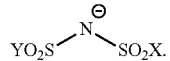

Furthermore, the ionic liquid includes a conducting salt containing:

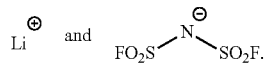

The electrolyte has less than 0.5 wt % of $PF_6^-$. The aluminum current collector is provided with a protective layer comprising $AlF_3$.

8 Claims, 1 Drawing Sheet

(51) Int. Cl.
    *H01M 10/052*     (2010.01)
    *H01M 10/0525*     (2010.01)
    *H01M 10/0568*     (2010.01)
    *H01M 10/0569*     (2010.01)
    *H01M 10/44*     (2006.01)

(52) U.S. Cl.
    CPC ... *H01M 10/0525* (2013.01); *H01M 10/0567* (2013.01); *H01M 10/0568* (2013.01); *H01M 10/446* (2013.01); *H01M 2300/0045* (2013.01)

(56) References Cited

U.S. PATENT DOCUMENTS

| | | | |
|---|---|---|---|
| 2011/0136019 A1* | 6/2011 | Amiruddin | H01M 10/0567 429/332 |
| 2012/0127631 A1 | 5/2012 | Schmidt et al. | |
| 2012/0328960 A1 | 12/2012 | Ito et al. | |
| 2015/0093655 A1* | 4/2015 | Kozelj | H01G 11/62 548/406 |

FOREIGN PATENT DOCUMENTS

| | | |
|---|---|---|
| EP | 1 837 333 A1 | 9/2007 |
| EP | 1 995 817 A1 | 11/2008 |
| EP | 2 421 080 A2 | 2/2012 |
| JP | 11-7962 A | 1/1999 |
| JP | 2004-87262 A | 3/2004 |
| JP | 2012-43709 A | 3/2012 |
| JP | 2013-30473 A | 2/2013 |
| JP | 2013-197061 A | 9/2013 |
| WO | WO 2011/077939 A1 | 6/2011 |

OTHER PUBLICATIONS

English translation of JP 2007134282 (Year: 2007).*
German-language Search Report issued in counterpart German Application No. 10 2014 219 414.8 dated Jul. 30, 2015 with partial English translation (12 pages).
International Search Report (PCT/ISA/210) issued in PCT Application No. PCT/EP2015/069107 dated Dec. 1, 2015 with English translation (7 pages).
German-language Written Opinion (PCT/ISA/237) issued in PCT Application No. PCT/EP2015/069107 dated Dec. 1, 2015 (6 pages).
English translation of Japanese language Office Action issued in counterpart Japanese Application No. 2017-514290 dated Mar. 6, 2019 (16 pages).
Korean-language Office Action issued in Korean Application No. 10-2017-7006943 dated Apr. 6, 2022 with English translation (18 pages).

* cited by examiner

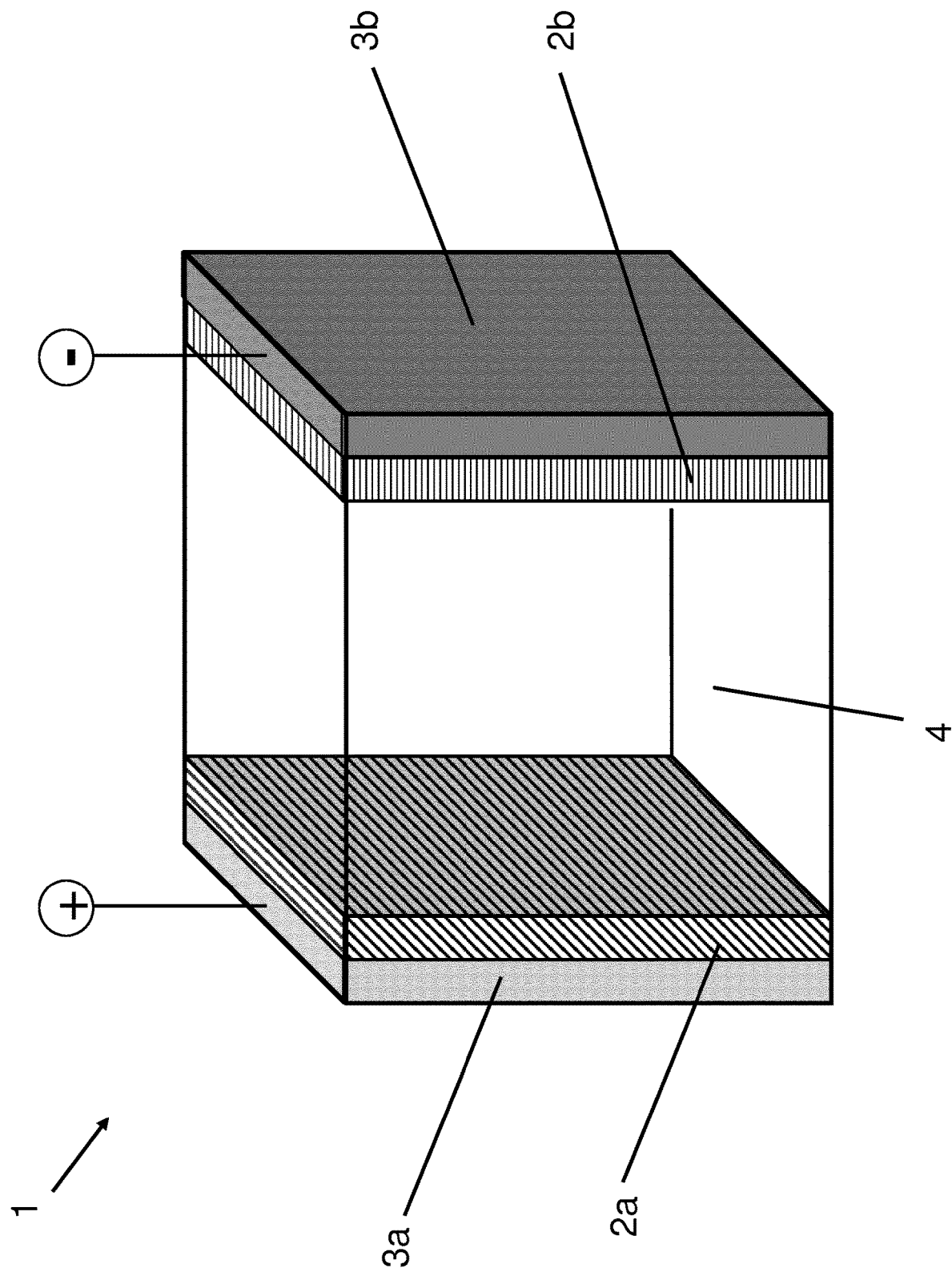

ELECTROCHEMICAL CELL, ELECTROLYTE SUITABLE FOR THE FILLING THEREOF, PRODUCTION METHOD THEREOF, AND METHOD FOR THE OPERATION THEREOF

CROSS REFERENCE TO RELATED APPLICATIONS

This application is a continuation of PCT International Application No. PCT/EP2015/069107, filed Aug. 20, 2015, which claims priority under 35 U.S.C. § 119 from German Patent Application No. 10 2014 219 414.8, filed Sep. 25, 2014, the entire disclosures of which are herein expressly incorporated by reference.

BACKGROUND AND SUMMARY OF THE INVENTION

Electrochemical cells are used for storing electrical energy for stationary and mobile applications. Stringent requirements are imposed here on the safety, eco-friendliness, reliability, and durability of the electrochemical cell.

It is an object of the invention, therefore, to provide an electrochemical cell having improved safety, eco-friendliness, and durability.

This and other objects are achieved by an electrochemical cell, an electrolyte suitable for filling the electrochemical cell, a method for producing an electrochemical cell, and a method for operating the electrochemical cell, in accordance with embodiments of the invention.

The invention provides an electrochemical cell comprising a negative electrode and a positive electrode.

The negative electrode of the electrochemical cell of the invention functions as an anode in a discharge operation, and the positive electrode functions as a cathode in a discharge operation. As used herein, "discharge operation" refers to the conversion of the chemical energy stored in the electrochemical cell into electrical energy which can then be supplied to a consumer.

The electrochemical cell of the invention further includes an aluminum current collector, which has an electrically conducting connection to the positive electrode, and also an electrolyte.

The electrolyte includes nonionic organic compounds which are present in an amount of less than 1.0 percent by weight of the total electrolyte. As used herein, "nonionic organic compounds" refer to organic compounds consisting of uncharged molecules. Nonionic organic compounds therefore contain no cations or anions. Typical examples of nonionic organic compounds which are present in conventional electrochemical cells acting as a solvent or as an additive in the electrolyte include, for example, carbonates such as dimethyl carbonate, diethyl carbonate or vinylene carbonate, but they also include other common organic compounds which do not belong to the group of the ionic liquids. Such compounds can often be used in electrochemical cells only by virtue of protective layers on both the negative and positive electrodes, without which they would decompose under operating conditions. Instability in the electrolyte, however, may result in capacity losses in the electrochemical cell.

The electrolyte also includes an ionic liquid as the solvent, the ionic liquid is present in an amount of at least 80 percent by weight of the total electrolyte.

Ionic liquids, in contrast to nonionic organic compounds, are characterized by much lower flammability, much lower vapor pressures, and a much greater thermal stability. The inventors have recognized that the operational reliability of the electrochemical cell of the invention can be increased significantly over that of conventional electrochemical cells if the amount of the ionic liquid present in the electrolyte is at least 80 percent by weight of the total electrolyte and at the same time the amount of nonionic organic compounds present in the electrolyte is less than 1.0 percent by weight of the total electrolyte.

The ionic liquid of the electrochemical cell of the invention includes a cation of the general formula:

where the radicals $R^1$ to $R^4$ independently of one another may be substituents comprising 1 to 15 carbon atoms, where the radicals can be linear or branched, where the radicals $R^3$ and $R^4$ also, together with the central N atom of the cation, can form a saturated ring, where the ring can have, in particular, five to seven members, and where the peripheral H atoms thereof can be substituted.

The ionic liquid further includes an anion of the general formula:

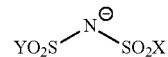

where the possible combinations for X and Y are as follows: X is $CF_3$ and Y is $CF_3$, X is $C_2F_5$ and Y is $C_2F_5$, X is $CF_3$ and Y is F, or X is $C_2F_5$ and Y is F.

Examples of anions include bis(trifluoromethanesulfonyl)imide ("TFSI"), bis(pentafluoroethanesulfonyl)imide ("BETI"), fluorosulfonyl(trifluoromethanesulfonyl)imide ("FTFSI"), and fluorosulfonyl(pentafluoroethanesulfonyl)imide ("FPFSI").

The electrolyte additionally has a conducting salt which is composed of

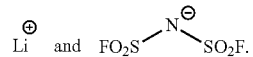

The conducting salt can include the anion bis(fluorosulfonyl)imide ("FSI") or as lithium bis(fluorosulfonyl)imide ("LiFSI"). For example, the electrolyte may have LiFSI as the sole conducting salt.

Furthermore, the electrolyte has an amount of less than 0.5 percent by weight of $PF_6^-$ (hexafluorophosphate).

Conventional electrochemical cells, in contrast, frequently have a greater amount of hexafluorophosphate anions in the electrolyte, as constituent of the conducting salt, for example (e.g., $LiPF_6$). The inventors of the present invention have determined, however, that under operating conditions, hexafluorophosphate is responsible for unwanted decomposition reactions or secondary reactions, which may lead to the release of corrosive, environmentally harmful, and toxic substances. In the case of conventional electrochemical cells, these substances cause corrosion to cell components and also lead to additional risks for the environment and safety. Through the presence of a particularly low fraction of $PF_6^-$ in the total electrolyte in the electrochemical cell of the invention, then, the eco-friendliness, safety, and durability are increased relative to conventional electrochemical cells.

Not only the electrolyte but also the current collectors of electrochemical cells are subject to exacting requirements. Current collectors make contact with the electrode materials and so allow the electrical current to be picked up and conveyed. On the side of the positive electrode in particular, current collectors may experience very high positive and hence strongly oxidizing potentials. Even in the case of aluminum current collectors, this leads to corrosion and dissolution, with adverse consequences for the reliability and durability of conventional electrochemical cells.

The aluminum current collector of the electrochemical cell of the invention has a protective layer containing $AlF_3$. The inventors of the present invention have determined that a protective layer containing $AlF_3$ offers particularly effective protection to the current collector from dissolution and corrosion and thus raises the reliability and durability of the electrochemical cell. The inventors have found, for example, that $AlF_3$ is not soluble in the ionic liquid which functions as a solvent in the electrochemical cell of the invention. $AlF_3$, for example, is not attacked by the anions of the ionic liquid or of the conducting salt.

An example of how the protective layer containing $AlF_3$ may be generated is by a reaction of the aluminum current collector with $PF_6^-$. Since $PF_6^-$ possesses not only inadequate chemical stability with respect to water but also low thermal stability (thermal decomposition starting at just 60° C.), the presence of $PF_6^-$ under operating conditions in conventional electrochemical cells results in the formation of unwanted toxic and corrosive byproducts and decomposition products (e.g., HF and $PF_5$). The inventors of the present invention have found that it is not necessary to hold $PF_6^-$ permanently in the electrochemical cell in order to obtain a protective layer containing $AlF_3$, by the presence of $PF_6^-$ in the conducting salt, for instance. In one aspect, the invention provides an electrochemical cell, which has a protective layer on the aluminum current collector, containing $AlF_3$, and at the same time does not contain large amounts of $PF_6^-$. The amount of $PF_6^-$ in the total electrolyte is lower than 0.5 percent by weight, and preferably, the electrolyte is free from $PF_6^-$. The electrochemical cell of the invention hence contains far lesser amounts of $PF_6^-$ than conventional electrochemical cells in which $PF_6^-$ is part of the conducting salt. For example, in conventional electrochemical cells, $LiPF_6$ is frequently utilized as the conducting salt. As a result, the electrochemical cell of the invention is characterized not only by a protected aluminum current collector but also, at the same time, it is safe to use.

The electrolyte of the electrochemical cell of the invention includes an ionic liquid as the solvent which is present in an amount of at least 80 percent by weight of the total electrolyte. In conjunction with the anions stated below, quaternary ammonium cations of the ionic liquid are included to permit a sufficiently low melting point and a sufficiently low viscosity even at temperatures well below the freezing point, allowing effective ion mobility and hence high conductivities even at low temperatures well below the freezing point, often well below −40° C. The anion of the ionic liquid is selected from the group of the consisting of: bis(trifluoromethanesulfonyl)imide (TFSI):

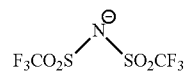

bis(pentafluoroethanesulfonyl)imide (BETI):

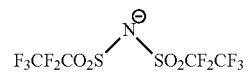

fluorosulfonyl(trifluoromethanesulfonyl)imide (FTFSI):

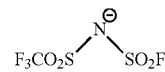

and fluorosulfonyl(pentafluoroethanesulfonyl)imide (FPFSI):

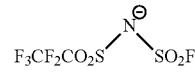

where TFSI and BETI are symmetrical in nature, the two other anions are asymmetric anions.

The ionic liquids can be prepared at a low cost and complexity and are available at reasonable prices. They possess very high chemical and electrochemical stability. They are also stable thermally up to temperatures of more than 300° C., whereas, under comparable electrochemical conditions, nonionic organic compounds often enter into unwanted decomposition reactions at temperatures as low as 60° C.

In one aspect, the electrolyte of the invention includes nonionic organic compounds present in an amount of less than 1.0 percent by weight of the total electrolyte, preferably, the electrolyte is to be free from nonionic organic compounds. Conventional cells, in contrast, usually contain nonionic organic compounds present in an amount significantly exceeding 1.0 percent by weight. In conventional electrochemical cells, nonionic organic compounds often serve as an addition to an ionic liquid which functions as the solvent, or are themselves used as solvents. Since the electrolyte of the electrochemical cell of the invention has less than 1.0 percent by weight of nonionic organic compounds in the total electrolyte, the electrolyte and also the electrochemical cell possess much greater stability than electrochemical cells having a greater amount of nonionic organic compounds. In particular, the electrolyte of the electrochemical cell of the invention is notable for relatively low volatility and hence a relatively low vapor pressure. With the electrochemical cell of the invention, therefore, even at temperatures above 60° C., there is no development of high pressures in the cell, which can lead to breakage of the electrochemical cell and to release of corrosive, toxic, and highly flammable substances. The electrolyte itself, moreover, is much less flammable than comparable electrolytes of conventional cells having a higher content of nonionic organic compounds. Similarly, the electrolyte of the cell of the invention possesses a greater chemical stability toward water, owing to the low fraction of nonionic organic compounds of less than 1.0 percent by weight, and is notable for high electrochemical stability within a broad potential range. In view of the greater stability of the electrolyte in the electrochemical cell of the invention, far fewer toxic and corrosive byproducts are formed to jeopardize safety or to reduce cell durability.

Besides the ionic liquid, the conducting salt is a further key constituent of the electrolyte of the electrochemical cell of the invention. The LiFSI conducting salt serves in particular as a source of lithium ions.

Another effect of using LiFSI is to introduce into the electrolyte a further anion, which is different from the anion of the ionic liquid solvent. Through the presence of at least two different anions, a reduction is achieved in the melting temperature of the electrolyte. Moreover, the simultaneous presence of two different anions permits comparatively low viscosity even at temperatures well below the freezing point. This leads in turn to effective charge carrier mobility and hence to high conductivities even at low temperatures.

Furthermore, the use of LiFSI removes the need for $LiPF_6$, which often functions as a conducting salt in conventional electrochemical cells. Replacing $LiPF_6$ with LiFSI as a conducting salt makes it possible to decouple the fraction of $PF_6^-$ in the electrolyte from the fraction of the conducting salt in the electrolyte, the fraction being dictated by the requirement for lithium ions. Since $LiPF_6$ is unstable at temperatures above 60° C. and may form toxic by-products or decomposition products such as hydrogen fluoride (HF) or highly toxic phosphorus pentafluoride ($PF_5$), for instance, the use of LiFSI makes it possible to increase significantly the safety of the electrochemical cell.

There are a range of conventional electrochemical cells utilizing ionic solvents with FSI as the anion of the ionic solvent. The inventors of the present invention, however, have determined that anions, namely TFSI, BETI, FTFSI, and FPFSI, are preferential over FSI as anions of the solvent. These anions not only have a greater chemical, electrochemical, and thermal stability than FSI, but are also more compatible, for example, with common electrode materials used for the negative electrode. For example, they have outstanding compatibility with carbon-based electrodes, such as graphite-based electrodes, whereas ionic solvents based on FSI are less compatible with such electrodes. For these reasons, the electrolyte of the electrochemical cell of the invention includes an ionic liquid which is present in an amount of 80 percent by weight of the total electrolyte, the anion of the ionic liquid being selected from TFSI, BETI, FTFSI, and FPFSI. FSI, in contrast, serves merely as the anion of the conducting salt in significantly smaller amounts. Overall, therefore, a greater stability of the electrolyte and of the electrochemical cell is achieved.

In one preferred embodiment, an electrochemical cell is provided which includes a negative electrode having carbon, silicon-carbon composites, tin-carbon composites, or combinations thereof. The negative electrode may consist in each case, moreover, of carbon, silicon-carbon composites, tin-carbon composites, or combinations thereof. Electrode materials containing carbon are notable for great versatility, high stability, and good electron transfer properties.

The negative electrode may further contain graphite or consists of graphite. Electrode materials containing graphite are comparatively stable electrode materials, owing to the high kinetic inhibition of electrochemical carbon oxidation, and are also inexpensive.

In one aspect of the disclosure, the negative electrode is connected to a copper current collector. Copper current collectors are of advantage on account of the outstanding conductivity of copper, which exceeds even the already very high conductivity of aluminum.

Furthermore, the electrochemical cell of the invention contains an amount of PF6− in the total electrolyte of less than 0.1 percent by weight, and preferably of less than 0.05 percent by weight, more preferably less than 0.01 percent by weight. It is particularly preferable for the amount of $PF_6^-$ present in the total electrolyte to be less than 0.005 and more preferably less than 0.001 percent by weight. Most preferable is for the electrolyte to be entirely free from $PF_6^-$. The lower the amount of $PF_6^-$ in the electrolyte, the less the extent to which corrosive, environmentally harmful or toxic by-products or decomposition products of unwanted reactions of the $PF_6^-$ can be formed. Therefore, particularly low amounts of $PF_6^-$ in the total electrolyte result in a further improvement in the safety, eco-friendliness, and stability of the cell.

In another aspect of the disclosure, the amount of nonionic organic compounds present in the total electrolyte is less than 0.5 percent by weight, preferably less than 0.1 percent by weight, more preferably less than 0.01 percent by weight. The electrolyte, furthermore, may also be entirely free from nonionic organic compounds. As well as the much greater volatility, flammability, and lower thermal stability by comparison with ionic liquids, it is advantageous for the stability and safety of the electrochemical cell if the amount of the nonionic organic compounds present in the electrolyte is limited.

In another aspect of the disclosure, the negative electrode has a protective layer having a polymer obtainable by a reaction of the negative electrode with

The construction of the protective layer may be accomplished, for example, by means of an electrochemical reaction. In particular, the protective layer may be formed during first charge-discharge events.

The protective layer on the negative electrode may include the elements nitrogen, sulfur, oxygen, and fluorine. The protective layer may, for example, include a polymer of the formula $FSO_2(NSOF)_nN^-SO_2F$. The polymer is stable, insulating to all electrons and conducting towards lithium ions. The protective layer on the negative electrode of the electrochemical cell of the invention protects the electrode materials of the negative electrode from destruction of the electrode structure in the course of the incorporation (intercalation) of solvated ions. For example, electrode materials which contain carbon, silicon-carbon composites or tin-carbon composites, and also mixtures thereof, are protected from aging and destruction of the layer structure that occur during the intercalation of solvated lithium ions.

At the same time the layer on the negative electrode, formed by a reaction with FSI, has the effect of protecting the electrolyte from reduction. Without the formation of protective layer on the negative electrode, electrolyte is progressively reduced and therefore consumed. The protective effect is therefore directed both at the negative electrode and at the electrolyte.

One preferred embodiment of the invention relates to an electrochemical cell, having an electrolyte, where the cation of the ionic liquid which functions as a solvent is characterized in that a plurality of the four sub stituents are sub stituents different from one another. The different nature of the substituents results in a lower melting point of the ionic liquid than in the case of substituents of identical kind. Particularly at very low temperatures, this leads to improved viscosity. In this way, the charge carriers of the lithium ions, for example, achieve high mobility, allowing high conductivities to be achieved even at low temperatures.

It is possible, moreover, for the substituents on the central nitrogen atom of the cation in the ionic liquid which functions as the solvent of the electrolyte to include 1 to 10 carbon atoms in each case. This has the advantage that in this way it is possible to achieve a relatively low viscosity even at relatively low temperatures as compared with substituents which comprise more carbon atoms. Frequently, furthermore, the substituents have significantly different numbers of carbon atoms, thus having significantly different chain lengths. This also promotes particularly good viscosity and hence good conductivity values of the electrolyte at low temperatures.

In another aspect of the disclosure, the substituents on the central nitrogen atom of the cation in the ionic liquid which functions as a solvent of the electrolyte have further elements in addition to carbon and hydrogen. In particular, the substituents may also include oxygen. In that case it is particularly advantageous for individual substituents or a plurality of substituents to include oxygen in the form of one or more ether groups. It is particularly advantageous, for example, if one of the substituents has one or more ether groups, while all other substituents are alkyl radicals. Through the introduction of ether groups and the associated reduced interaction between the substituents of the cations, improvement is achieved in the viscosity and hence the ion mobility particularly at very low temperatures. It is therefore also possible, for example, for the substituents $R^1$ to $R^4$ to be alkyl or alkoxy groups.

It is therefore also possible for at least one of the substituents of the ammonium cation to be an alkyl radical. It is also possible for all substituents on the ammonium cation to be alkyl substituents. In each of these cases, the alkyl substituents may each independently of one another be branched or linear. Examples of preferred alkyl substituents include methyl, ethyl, propyl, butyl, pentyl, hexyl, heptyl, octyl, nonyl and decyl substituents.

In another aspect of the disclosure, two of the substituents on the central nitrogen atom of the cation in the ionic liquid which functions as a solvent of the electrolyte form a saturated ring. For example, five-, six-, and seven-membered rings may be formed. These rings may include oxygen in the form of an ether group, or alternatively may be free from oxygen. It is particularly advantageous if the rings are five-membered or six-membered saturated rings, since such rings frequently permit better viscosity and conductivity than larger rings. It is further possible for peripheral hydrogen atoms of the rings to be substituted. It is possible, for example, for the hydrogen atoms to be substituted by alkyl groups. It is also possible, however, for none of the peripheral hydrogen atoms to be substituted. The substitution of peripheral hydrogens in the ring may be utilized, for example, in order to generate asymmetry in the cation. The effect of this is that the melting point and the viscosity of the solvent can be reduced and conductivity values can be improved even at low temperatures.

In another aspect of the disclosure, the cation of the ionic liquid comprises cations of the formula

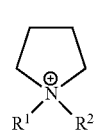 or 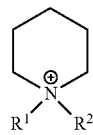

Cations of this kind are especially suitable as cations for the ionic liquid which forms the solvent of the electrolyte, since they are known in the art for outstanding electrochemical and thermal stability. Ionic liquids of these cations also usually possess very low melting points and sufficiently low viscosity and hence still enable high ion mobility and in turn provide very good conductivities even at temperatures well below the freezing point, in many cases well below −40° C.

Furthermore, the radicals $R^1$ and $R^2$ of the cation of the solvent may be different from one another and may otherwise be selected independently of one another from $(CH_2)_nCH_3$, where n=0 to 9, more particularly n=1 to 5, and $(CH_2CH_2O)_mCH_3$, where m=1 to 4, more particularly m=1 or 2, and $(CH_2OCH_2)_pCH_3$, where p=1 to 4, more particularly p=1 or 2.

Cations of these formulae, specifically, permit particularly good conductivity on the part of the electrolyte.

In another aspect of the disclosure, the cation of the ionic liquid is asymmetric, more particularly having an asymmetrically substituted nitrogen atom. As used herein, "asymmetric" means that the central nitrogen atom has four different substituents. The effect of using asymmetric cations is that it enables a particularly low melting point and also a very low viscosity and in turn provides very high conductivities on the part of the ionic liquid.

It is possible, furthermore, for exactly one of the two radicals $R^1$ and cation of the solvent to be $(CH_2CH_2O)_m$—$CH_3$ where m=1 or 2, more particularly $CH_2CH_2$—O—$CH_3$. Ionic liquids of these cations with the above-stated anions possess particularly good conductivities even at temperatures well below −40° C., and often even at temperatures below −100° C.

Examples of cations of the ionic liquid solvent, serving merely for illustration, are identified below:

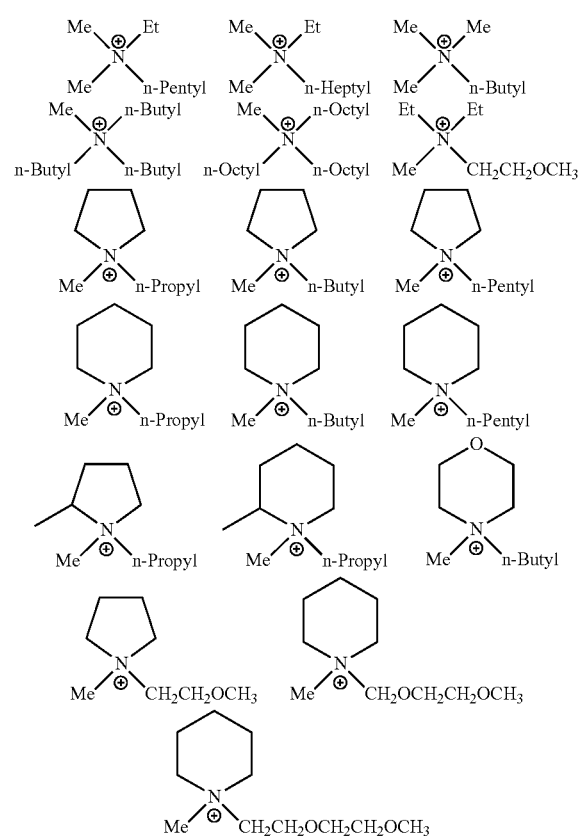

-continued

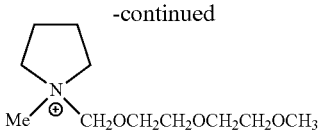

The invention, however, is not confined to electrolytes comprising the stated cations as cations of the ionic liquid which functions as solvent of the electrochemical cell.

Furthermore, the anion of the solvent may have non-identical substituents for X and Y. The anion therefore has asymmetric character. Examples of ionic liquids with asymmetric anions include:

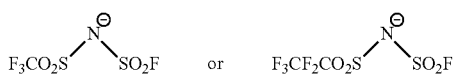

in combination with the aforementioned cations, allow the formation of ionic liquids having far lower melting points than is possible with symmetrical anions. Ionic liquids of this kind are notable for particularly outstanding conductivities even at temperatures of below −100° C. Conductivities much higher than $10^{-4}$ Scm$^{-1}$ at −40° C. are achieved with ionic liquids of this kind.

In one aspect of the disclosure, the anion of the solvent has identical substituents for X and Y. Examples of ionic liquids with symmetrical anions include:

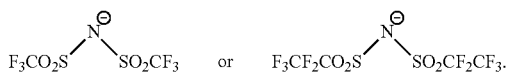

These possess the advantage that they can be produced frequently with much less complexity and more inexpensively than ionic liquids comprising asymmetric anions.

In another aspect of the disclosure, the electrochemical cell includes an additional cation in the electrolyte, the cation having the general formula:

where the radicals $R^A$ to $R^D$ independently of one another may be substituents comprising 1 to 15 carbon atoms, where the radicals can be linear or branched, and where the radicals $R^C$ and $R^D$ additionally, together with the central N atom of the cation, can form a saturated ring, where the ring can have, in particular, five to seven members, and where the peripheral H atoms thereof can be substituted, the additional cation being different from the cation of the solvent.

The additional cation is otherwise subject to all features, properties, and preferred embodiments already set out above for the cation of the ionic solvent.

The presence of the additional cation allows the melting point to be lowered and the viscosity reduced and hence the ion mobility and conductivity increased, especially at low temperatures. In this specific embodiment of the invention, therefore, the electrolyte has not only the lithium cations but also at least two further cations and at least two anions. The multiplicity of different anions and cations in this embodiment leads to a reduction in the viscosity at low temperatures.

In another aspect of the disclosure, the electrochemical cell is a lithium-ion battery or lithium-ion accumulator. Lithium-ion batteries allow high cell voltages, are rechargeable, and are notable for particularly high energy densities. Lithium-ion batteries are therefore considered to have particularly broad-spectrum usefulness for both mobile and stationary applications. For example, the lithium-ion battery may comprise $LiCoO_2$, $LiMn_2O_4$, and $LiFePO_4$ or mixtures thereof, as materials for the positive electrode. The positive electrode of the lithium-ion battery may also consist of $LiCoO_2$, $LiNiO_2$, $LiMn_2O_4$, and $LiFePO_4$ or mixtures thereof.

The electrolyte described for the electrochemical cell of the invention is especially suitable, for example, for withstanding the high potentials in lithium-ion batteries.

The invention further relates to an electrolyte having nonionic organic compounds present in an amount of less than 1.0 percent by weight of the total electrolyte, suitable for filling an electrochemical cell. The electrolyte includes an ionic liquid as the solvent, present in an amount of 80 to 94.9 percent by weight of the total electrolyte. The ionic liquid includes a cation having the following formula:

where the radicals $R^1$ to $R^4$ independently of one another may be substituents comprising 1 to 15 carbon atoms, where the radicals can be linear or branched, where the radicals $R^3$ and $R^4$ also, together with the central N atom of the cation, can form a saturated ring, where the ring can have, in particular, five to seven members, and where the peripheral H atoms thereof can be substituted, an anion of the following formula:

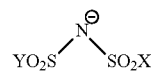

where possible combinations for X and Y are as follows: X is —$CF_3$ and Y is —$CF_3$, X is —$C_2F_5$ and Y is —$C_2F_5$, X is —$CF_3$ and Y is —F, or X is —$C_2F_5$ and Y is —F, a conducting salt present in an amount of 5 to 15 percent by weight of the total electrolyte, composed of

The electrolyte further includes an additive present in an amount of 0.1 to 5 percent by weight of the total electrolyte. The additive includes a cation of the following formula:

where the radicals $R^A$ to $R^D$ independently of one another may be substituents comprising 1 to 15 carbon atoms, where the radicals can be linear or branched, and where the radicals $R^C$ and $R^D$ additionally, together with the central N atom of the cation, can form a saturated ring, where the ring can have, in particular, five to seven members, and where the peripheral H atoms thereof can be substituted, and $PF_6^-$ as the anion.

The electrolyte of the above-described electrochemical cell of the invention emerges from this electrolyte after the filling of the electrochemical cell through a few charge-discharge cycles of the electrochemical cell. As used herein, a "charge-discharge cycle" means that the electrochemical cell is charged once and subsequently discharged.

The electrolyte suitable for filling the electrochemical cell and the electrolyte resulting after one or a few charge-discharge cycles differ from one another in that the electrolyte suitable for filling the cell includes an additive which in the course of the first charge-discharge cycle, in particular in the course of the first three charge-discharge cycles, enters into a chemical reaction with the aluminum current collector. $PF_6^-$ anions of the additive react with the aluminum current collector to form a protective layer comprising $AlF_3$. As a result, the $PF_6^-$ anions are largely consumed, with $PF_6^-$ anions of less than 0.5 percent by weight in the final electrolyte. Moreover, the electrolyte for filling the electrochemical cell and the resulting electrolyte may also differ in that some of the FSI anions (that is, the anions of the conducting salt) are able to enter into a reaction with the negative electrode, in which case a protective layer may be formed on the negative electrode. The fraction of FSI anions in the resulting electrolyte may therefore be smaller than the fraction in the electrolyte suitable for filling the cell.

All other properties and features of the electrolyte of the electrochemical cell of the invention that have already been described above also apply to the electrolyte suitable for filling the electrochemical cell. Furthermore, all preferred embodiments of the electrochemical cell, insofar as they relate to the electrolyte, can also be transposed to the electrolyte which is suitable for filling the electrochemical cell.

In relation to the additive of the electrolyte, the cation of the additive, which is an ionic additive, is subject to the same properties and preferred embodiments as for the above-described cation of the ionic liquid which forms the solvent of the electrochemical cell of the invention.

The additive includes a cation of the following formula:

and an anion $PF_6^-$, which serves as the $PF_6^-$ source for the reaction with the aluminum current collector to form a protective layer comprising $AlF_3$. By introducing $PF_6^-$ in the form of a salt of this kind it is possible to do without the use of $LiPF_6$ as the $PF_6^-$ source. This allows $PF_6^-$ to be introduced by a salt other than the conducting salt. The amount of conducting salt required in the electrolyte is determined above all by the demand for lithium ions. On addition of $PF_6^-$ by the conducting salt, therefore, unnecessarily large amounts of $PF_6^-$ are introduced into the electrolyte, and, owing to the adverse properties of $PF_6^-$, lead to problems of safety and eco-friendliness, as a result, forming unwanted by-products (e.g., HF, $PF_5$). Through the introduction of $PF_6^-$ in the form of an additive different from the conducting salt, it becomes possible to achieve decoupling from the amount of conducting salt added, and so to use much smaller quantities of $PF_6^-$, so that $PF_6^-$ can be broken down almost completely during the first charge-discharge cycles.

To include an amount of 80 to 94.9 percent by weight of the ionic liquid in the electrolyte is advantageous, since the latter is characterized by particularly high chemical, electrochemical, and thermal stability. As a result of the high stability of this principal component of the electrolyte, the overall stability of the electrolyte is high.

To include an amount of 5 to 15 percent by weight of the conducting salt LiFSI in the total electrolyte ensures a sufficient lithium ion concentration. Furthermore, there are sufficient FSI anions to form the protective layer on the negative electrode. Preferably, the amount of the conducting salt is from 5 to 12 percent by weight of the total electrolyte and, more preferably 6 to 10 percent by weight of the total electrolyte.

To include an amount of 0.1 to 5 percent by weight of the additive in the total electrolyte ensures a sufficiently high initial content of $PF_6^-$ in the electrolyte in order to generate a functional protective layer comprising $AlF_3$ on the aluminum current collector in the course of the first charge-discharge cycles. At the same time, the fraction of $PF_6^-$, which has a much lower molecular weight in comparison to the cation of the additive, is sufficiently low that $PF_6^-$ is largely broken down after a few charge-discharge cycles. Preferably, the additive in the electrolyte is from 0.1 to 2 percent by weight. In another preferred embodiment, the amount of the additive in the electrolyte is 1 to 5 percent by weight, more particularly 1 to 2 percent by weight. As well as protecting the aluminum current collector, the additive also has the effect of protecting the electrolyte against unwanted oxidation.

In another aspect of the disclosure, an electrolyte suitable for filling an electrochemical cell is provided, where the cation of the additive is identical to the cation of the solvent. An electrolyte of this kind is less complex and usually also easier and less expensive to produce than an electrolyte having different kinds of cations in the additive and in the solvent.

In another aspect of the disclosure, an electrolyte suitable for filling an electrochemical cell is provided, where the cation of the additive is different from the cation of the solvent. In comparison to an electrolyte having only one cation apart from the lithium cations, an electrolyte of this kind possesses a comparatively lower melting temperature and also a lower viscosity at relatively low temperatures. This results in particularly high ion mobility and improved conductivities even at low temperatures.

The additional cation, already described in connection with the electrochemical cell of the invention, emerges from the additive when the additive comprises a cation which is not the same as the cation of the ionic liquid which forms the solvent.

The invention further relates to a method for producing an electrochemical cell. The method includes the following steps:

A) providing an electrochemical cell without electrolyte, including a positive electrode, a negative electrode, and an aluminum current collector, B) filling the electrochemical cell with an electrolyte according to the present invention suitable for filling the electrochemical cell, C) charging and discharging the filled electrochemical cell, with step C) being carried out at least once, preferably at least three times, and where in method step C), owing to a reaction of the $PF_6^-$ with the aluminum current collector, a protective layer comprising $AlF_3$ is formed on the aluminum current collector, and, owing to a reaction of the

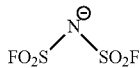

with the negative electrode, a protective layer is formed on the negative electrode.

The method outlined describes the production of an electrochemical cell of the invention, utilizing the electrolyte of the invention suitable for filling an electrochemically cell. In this method, no $LiPF_6$ is used. $PF_6^-$ is introduced only in the form of the above-described additive into the electrolyte. In this way, the safety of the method for producing the electrochemical cell is also much higher than for methods with $LiPF_6$, since the additive has a greater stability than $LiPF_6$ and it is possible to avoid unwanted secondary reactions involving release of toxic or irritant substances.

In another aspect of the disclosure, in the method for producing the electrochemical cell, step C) is carried out no more than five times, more preferably, no more than three times. It is also possible for step C) to be carried out only once.

The invention further relates to a method for operating an electrochemical cell, including a positive electrode, a negative electrode, an aluminum current collector, and an electrolyte suitable for filling the electrochemical cell, where during the first charge-discharge cycles, more particularly during the first three charge-discharge cycles, owing to a reaction of the $PF_6^-$ with the aluminum current collector, a protective layer comprising $AlF_3$ is formed on the aluminum current collector, and, owing to a reaction of the

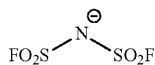

with the negative electrode, a protective layer is formed on the negative electrode.

In yet another aspect of the disclosure, the method of the invention allows the construction of the above-described protective layers both on the negative electrode and on the aluminum current collector, with simultaneous consumption of $PF_6^-$ which is unwanted for permanent operation. The resulting electrolyte predominantly includes the extremely thermally, chemically, and electrochemically stable ionic liquid, which functions as a solvent, and also the essential lithium cations. The resulting electrolyte may include FSI anions in a relatively small degree, whereas $PF_6^-$ ions are hardly present any longer. This combination allows the desired protective layers to be produced on the negative electrode and on the aluminum current collector, while at the same time the resulting electrolyte is virtually free from unwanted components, with only highly stable and safe components remaining in the electrolyte.

In the text below, the synthesis of the additives in the electrolyte of the invention that is suitable for filling the electrochemical cell will briefly be addressed.

The additive is produced by means of ion exchange reactions.

One possible synthesis is shown below, by way of example, for the additive N-methyl-N-butylpyrrolidinium hexafluorophosphate ("$PYR_{14}PF_6$").

Acting as the starting material is the commercially available $PYR_{14}Br$, which is reacted with $AgPF_6$ in water or, alternatively, in an organic solvent, such as acetonitrile. In this reaction, by ion exchange, $PYR_{14}PF_6$ is formed, which like the two reactants is also soluble in water (or acetonitrile). A further product formed is AgBr, which forms a precipitate. The AgBr precipitation product may then be separated off by filtration or centrifuging, for example. The resulting solution contains the desired product $PYR_{14}PF_6$, which can be obtained by evaporation of the solvent.

Preferred solvents in the reaction include water, acetonitrile or mixtures thereof. In order to prevent the product being contaminated with silver, ion exchange may also be carried out, for example, by means of potentiometric titration. The product obtained can be purified, for example, by recrystallization, including by multiple recrystallization if desired.

An alternative synthesis route accomplishes the ion exchange not with $AgPF_6$ but instead with $LiPF_6$. In this case, $PYR_{14}Br$ reacts with $LiPF_6$ to form $PYR_{14}PF_6$. The solvent used is an ethanolic solution (anhydrous ethanol). The product can be obtained by extraction using dichloromethane, for example.

In general, the additives can be synthesized from the halides, preferably the bromides, of the quaternary tetrasubstituted ammonium cation, by reaction with $AgPF_6$ or $LiPF_6$ or comparable salts of hexafluorophosphate.

This and other objects, advantages and novel features of the present invention will become apparent from the following detailed description of one or more preferred embodiments when considered in conjunction with the accompanying drawing.

BRIEF DESCRIPTION OF THE DRAWING

FIG. 1 shows a diagram representation of the electrochemical cell (1).

DETAILED DESCRIPTION OF THE DRAWING

In detail, FIG. 1 shows an electrochemical cell (1) which has a positive electrode (2a) and a negative electrode (2b). The positive electrode (2a) has an electrically conducting connection to an aluminum current collector (3a), which has a protective layer comprising $AlF_3$. The negative electrode may also have a connection to a current collector (3b). Furthermore, the electrochemical cell (1) includes an electrolyte (4) in accordance with one or more aspects of the invention.

Specified below for illustration are two examples of electrolyte compositions suitable for filling the electrochemical cell.

EXAMPLE 1

The electrolyte according to working example 1 contains an ionic liquid of the formula:

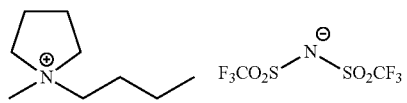

as the solvent, in an amount of 92 percent by weight of the total electrolyte. The electrolyte suitable for filling the cell, according to working example 1, further contains a conducting salt, LiFSI:

in an amount of 7 percent by weight of the total electrolyte. Furthermore, the electrolyte filling the cell includes an additive:

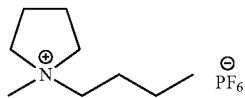

in an amount of 1 percent by weight of the total electrolyte.

EXAMPLE 2

The electrolyte according to working example 2 contains an ionic liquid of the formula:

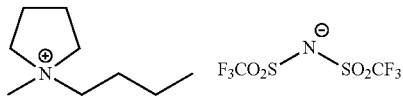

as the solvent, in amount of 90 percent by weight of the total electrolyte. The electrolyte suitable for filling the cell, according to working example 2, further includes a conducting salt, LiFSI:

in an amount of 8 percent by weight of the total electrolyte. Furthermore, the electrolyte filling the cell includes an additive:

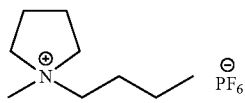

in an amount of 2 percent by weight of the total electrolyte.

The invention described here is not confined by the description with reference to the working examples. Instead, the invention embraces every new feature and also every combination of features included in particular in each combination of features in the claims, even if that feature or that combination is itself not explicitly stated in the claims or working examples.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrochemical cell, comprising:
   (i) a positive electrode;
   (ii) a negative electrode;
   (iii) an aluminum current collector, having an electrically conducting connection to the positive electrode; and
   (iv) an electrolyte, the electrolyte comprising:
   nonionic organic compounds present in an amount of less than 1.0 percent by weight of the total electrolyte, wherein the nonionic organic compounds contain no cations or anions; and
   an ionic liquid as a solvent, wherein the ionic liquid is present in the electrolyte in an amount of at least 80 percent by weight of the total electrolyte, the ionic liquid consisting of:
   a cation of the formula:

wherein the radicals $R^1$ to $R^4$ independently of one another may be substituents comprising 1 to 15 carbon atoms, wherein the radicals can be linear or branched, wherein the radicals $R^3$ and $R^4$ also, together with the central N atom of the cation, can form a saturated ring, wherein the ring can have five to seven members, wherein only one of the $R^1$ and $R^2$ is $(CH_2CH_2O)_m$—$CH_3$, where m=1 or 2, and wherein the peripheral H atoms thereof can be substituted;
   an anion of the formula:

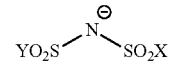

wherein X and Y are selected from the following combinations: X is $CF_3$ and Y is F, or X is $C_2F_5$ and Y is F; and
   a conducting salt consisting of:

wherein the electrolyte contains no $PF_6^-$, and
   wherein the aluminum current collector has a protective layer comprising $AlF_3$.

2. The electrochemical cell according to claim 1, wherein the amount of nonionic organic compounds present in the electrolyte is less than 0.5 percent by weight.

3. The electrochemical cell according to claim 1, wherein the amount of nonionic compounds present in the electrolyte is less than 0.1 percent by weight.

4. The electrochemical cell according to claim 1, wherein the negative electrode has a protective layer comprising a polymer obtainable by a reaction of the negative electrode with

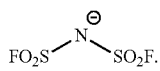

5. The electrochemical cell according to claim 1, wherein the cation comprises cations of the formulae

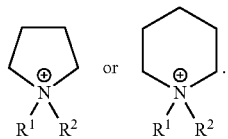

6. The electrochemical cell according to claim 1, wherein the cation is asymmetric.

7. An electrochemical cell, comprising:
(i) a positive electrode;
(ii) a negative electrode;
(iii) an aluminum current collector, having an electrically conducting connection to the positive electrode; and
(iv) an electrolyte, the electrolyte comprising:
nonionic organic compounds present in an amount of less than 1.0 percent by weight of the total electrolyte, wherein the nonionic organic compounds contain no cations or anions; and
an ionic liquid as a solvent, wherein the ionic liquid is present in the electrolyte in an amount of at least 80 percent by weight of the total electrolyte, the ionic liquid consisting of:
a first cation of the formula:

wherein the radicals $R^1$ to $R^4$ independently of one another may be substituents comprising 1 to 15 carbon atoms, wherein the radicals can be linear or branched, wherein the radicals $R^3$ and $R^4$ also, together with the central N atom of the cation, can form a saturated ring, wherein the ring can have five to seven members, wherein only one of the $R^1$ and $R^2$ is $(CH_2CH_2O)_m$—$CH_3$, where m=1 or 2, and wherein the peripheral H atoms thereof can be substituted;
a second cation of the formula:

wherein the radicals $R^A$ to $R^D$ independently of one another may be substituents comprising 1 to 15 carbon atoms, wherein the radicals can be linear or branched, and wherein the radicals $R^C$ and $R^D$ additionally, together with the central N atom of the cation, can form a saturated ring, where the ring can have five to seven members, and wherein the peripheral H atoms thereof can be substituted, wherein the second cation is different from the first cation in the ionic liquid;
an anion of the formula:

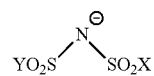

wherein X and Y are selected from the following combinations: X is $CF_3$ and Y is F, or X is $C_2F_5$ and Y is F; and
a conducting salt consisting of:

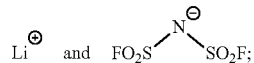

wherein the electrolyte contains no $PF_6^-$, and
wherein the aluminum current collector has a protective layer comprising $AlF_3$.

8. The electrochemical cell according to claim 1, wherein the electrochemical cell is a lithium-ion battery.

\* \* \* \* \*